United States Patent
Watanabe et al.

(10) Patent No.: US 6,731,458 B2
(45) Date of Patent: May 4, 2004

(54) THIN FILM MAGNETIC HEAD WITH UPPER CORE AND LOWER CORE LAYERS REDUCING SIDE-FRINGING

(75) Inventors: Toshinori Watanabe, Niigata-ken (JP); Hisayuki Yazawa, Niigata-Ken (JP)

(73) Assignee: Alps Electric Co., Ltd., Tokyo (JP)

( * ) Notice: Subject to any disclaimer, the term of this patent is extended or adjusted under 35 U.S.C. 154(b) by 167 days.

(21) Appl. No.: 09/822,581

(22) Filed: Mar. 30, 2001

(65) Prior Publication Data
US 2001/0026419 A1 Oct. 4, 2001

(30) Foreign Application Priority Data
Apr. 3, 2000 (JP) ........................................ 2000-100368

(51) Int. Cl.[7] ............................................... G11B 5/127
(52) U.S. Cl. ...................................................... 360/126
(58) Field of Search .......................................... 360/126

(56) References Cited

U.S. PATENT DOCUMENTS

| | | | |
|---|---|---|---|
| 5,224,002 A | * | 6/1993 | Nakashima et al. ........ 360/126 |
| 5,452,164 A | | 9/1995 | Cole et al. ................... 360/126 |
| 5,590,008 A | * | 12/1996 | Tanabe et al. ............... 360/126 |
| 5,649,351 A | | 7/1997 | Cole et al. ................... 360/126 |
| 5,652,687 A | | 7/1997 | Chen et al. .................. 360/126 |
| 5,802,700 A | | 9/1998 | Chen et al. .................. 360/126 |
| 5,805,391 A | * | 9/1998 | Chang et al. ................ 360/317 |
| 6,108,167 A | * | 8/2000 | Tateyama et al. ........... 360/126 |
| 6,636,381 B1 | * | 10/2003 | Sato et al. ................... 360/126 |

FOREIGN PATENT DOCUMENTS

JP    11-149620    6/1999

\* cited by examiner

*Primary Examiner*—David Davis
(74) *Attorney, Agent, or Firm*—Brinks Hofer Gilson & Lione

(57) ABSTRACT

The leak magnetic field generated from the upper core layer toward the upper magnetic pole layer can concentrate in the vicinity of the gap layer to suppress side-fringing from generating while increasing the overwrite, by making the saturation magnetic flux density Bs1 of the upper magnetic pole layer to be higher than the saturation magnetic flux density Bs2 of the upper core layer, and by directly bonding the upper core layer on the upper magnetic pole layer.

4 Claims, 10 Drawing Sheets

THIN FILM MAGNETIC HEAD WITH UPPER CORE AND LOWER CORE LAYERS REDUCING SIDE-FRINGING

BACKGROUND OF THE INVENTION

1. Field of the Invention

The present invention relates to a thin film magnetic head to be used for a floating type magnetic head. More particularly, the present invention relates to a thin film magnetic head that can properly reduce side-fringing and improve overwrite.

2. Description of the Related Art

FIG. 13 is a partial front view of the structure of a conventional thin film magnetic head (an inductive head) viewed from the surface side facing a recording medium. The reference numeral 1 shown in FIG. 13 is a lower core layer formed of a magnetic material such as Permalloy.

As shown in FIG. 13, a lower magnetic pole layer 3, a gap layer 5 and an upper magnetic pole layer 6 are formed on the lower core layer 1, and the width of the upper pole layer 6 in the track width direction (the X direction in the drawing) is restricted to have a track width Tw.

The lower magnetic pole layer 3, gap layer 5 and upper magnetic pole layer 6 are formed so as to be exposed on a surface facing the recording medium.

Insulation layers 7 are formed at both sides of the lower magnetic pole layer 3, gap layer 5 and upper magnetic pole layer 6 along the track width direction (X direction) as shown in FIG. 13.

A coil layer 13 (not shown) is formed at the back of the insulation layers 7 in the height direction (the Y direction in the drawing).

A magnetically coupled upper core layer 8 is formed on the upper magnetic pole layer 6 as shown in FIG. 13. The tip surface of the upper core layer 8 is formed so as to be exposed on the surface facing the recording medium as shown in FIG. 13, and the width T3 of the upper core layer 8 in the track width direction is formed to be larger than the track width Tw.

However, the structure of the conventional thin film magnetic head involved the following problems.

The upper magnetic pole layer 6 and the upper core layer 8 were formed of magnetic materials having the same saturation magnetic flux densities Bs with each other in the conventional thin film magnetic head. Accordingly, as shown in FIG. 13, the leak magnetic field generated from the upper core layer 8 formed with a width T3 larger than the track width Tw in the upper magnetic pole layer 6 did not concentrate in the vicinity of the gap layer, and the leak magnetic field was generated to spread toward the track width direction with a width larger than the track width Tw (the arrow shown by dotted arrows in FIG. 13), thereby causing side-fringing.

Side-fringing would be more evident when the track width Tw is further reduced for increasing the recording density in the future.

One method devised for suppressing side-fringing from generating is, for example, to form the tip surface 8a of the upper core layer 8 directed toward the surface side facing the recording medium so that it is retreated toward the height direction (Y direction) from the surface facing the recording medium.

When the upper core layer 8 and the upper magnetic pole layer 6 are formed of the magnetic materials having the same saturation magnetic flux densities with each other, the retreat length (the recess length) should be increased for properly preventing side-fringing from generating. However, it is a problem that the contact area between the upper magnetic pole layer 6 and the upper core layer 8 as well as overwrite decrease. Overwriting as used herein refers to writing the signals over the signals that have been already recorded. Signals are at first recorded at a low frequency, and then overwritten at a high frequency. The overwrite is accessed by the amount of decrease of remanent output of the recording signal from the recording signal output at the low frequency before high frequency overwriting.

SUMMARY OF THE INVENTION

Accordingly, it is an object of the present invention for solving the foregoing problems to provide a thin film magnetic head capable of properly preventing side-fringe from generating while improving the overwrite.

The present invention provides a thin film magnetic head comprising a lower core layer, a recording core, an upper core layer formed on the recording core, and a coil for inducing a recording magnetic field on the lower core layer, recording core and upper core layer; with the recording core comprising a lower magnetic pole layer, a gap layer and an upper magnetic pole layer, or a gap layer and an upper magnetic pole layer, sequentially laminated on the lower core layer, and exposed on a surface facing a recording medium, and wherein the upper magnetic pole layer is formed of a magnetic material having a higher saturation magnetic flux density than the upper core layer, and the upper core layer is directly bonded to the upper magnetic pole layer.

The upper magnetic pole layer has a higher saturation magnetic flux density than the upper core layer in the present invention. The upper core layer having a higher saturation magnetic flux density than the saturation magnetic flux density of the upper magnetic pole layer is directly bonded on the upper magnetic pole layer. Consequently, the leak magnetic field generated from the upper core layer may concentrate in the vicinity of the gap layer to hardly spread the leak magnetic field in the track width direction with a width wider than the track width Tw, thereby enabling side-fringing to be properly suppressed from generating.

Since the saturation magnetic flux density Bs1 of the upper magnetic pole layer is higher than the saturation magnetic flux density Bs2 of the upper core layer in the present invention, magnetic saturation in the upper magnetic pole layer, and thus attenuation of the magnetic flux density, may be suppressed to enable the overwrite to be improved.

Preferably, the ratio Bs1/Bs2 between the saturation magnetic flux density Bs1 of the upper magnetic pole layer and the saturation magnetic flux density Bs2 of the upper core layer is 1.08 or more, because side-fringing is suppressed while improving the overwrite when the ratio is within the range as described above.

Preferably, the saturation magnetic flux density Bs1 of the upper magnetic pole layer is 1.3 T or more, and the saturation magnetic flux density Bs2 of the upper core layer is 1.2 T or less.

It is preferable that the tip surface of the upper core layer directing toward the side facing the recording medium is located at a certain distance retreat from the surface facing the recording medium to the height direction, because side-fringing may be properly suppressed by the disposition of the tip surface as described above.

Although the overwrite decreases due to decrease of the contact area between the upper magnetic pole layer and upper core layer when the retreat distance is too large, the magnitude of generated side-fringing is not so large in the present invention even when the tip surface of the upper core layer is exposed on the surface facing the recording medium. Accordingly, generation of side-fringing can be more properly suppressed with a small retreat distance of the tip surface, thereby enabling a high OR intensity to be maintained without causing a decrease in the contact area between the upper core layer and upper magnetic pole layer.

Preferably, the shortest retreat distance L1 from the surface facing the recording medium to the tip surface of the upper core layer is within a range of $0<L1\leq1.5$ μm, because good OR intensity may be maintained without decreasing the contact area between the upper core layer and upper magnetic pole layer.

DESCRIPTION OF THE PREFERRED EMBODIMENT

Figure 1:
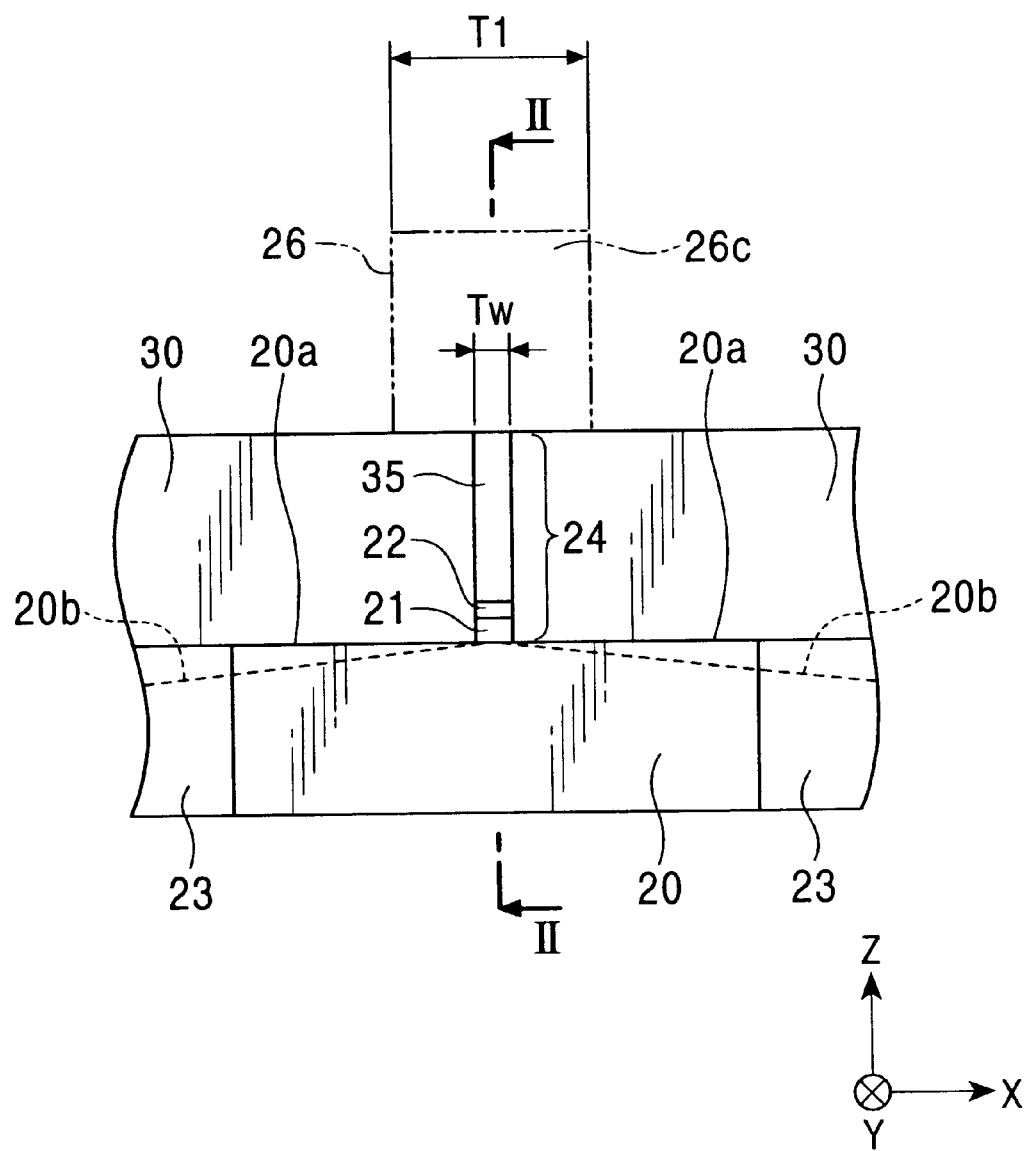
FIG. 1 shows a partial front view of the structure of the thin film magnetic head in one embodiment according to the present invention.
Figure 2:
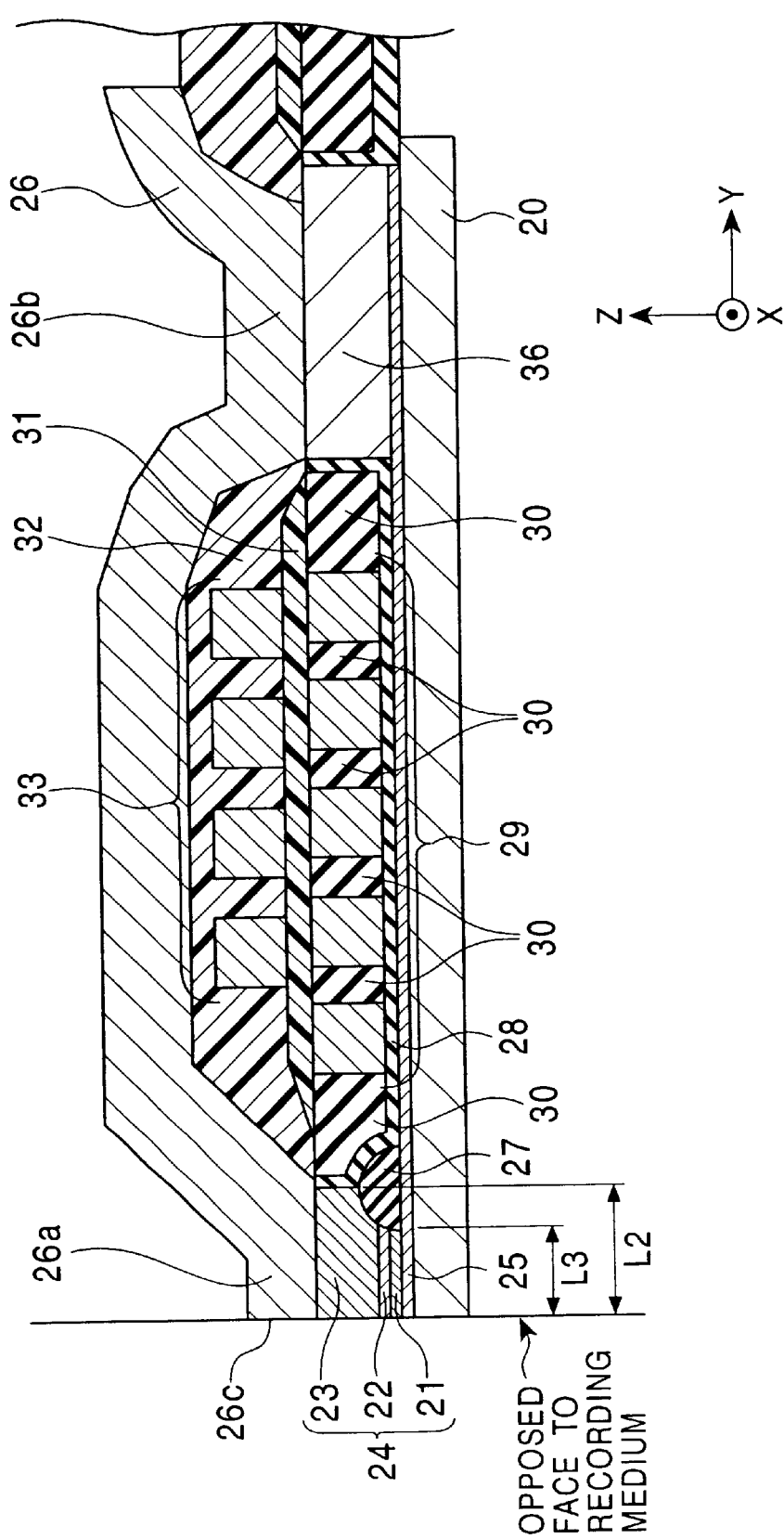
FIG. 2 shows a partial cross section of the thin film magnetic head cut along the line II—II in FIG. 1.

FIG. 1 shows a partial front view of the structure of the thin film magnetic head in one embodiment according to the present invention, and FIG. 2 shows a partial cross section of the thin film magnetic head cut along the line II—II in FIG. 1.

While the thin film magnetic head shown in FIG. 1 is a recording inductive head, a playback head (MR head) taking advantage of a magnetoresistive effect may be laminated under the inductive head.

The reference numeral 20 shown in FIGS. 1 and 2 denotes a lower core layer made of a magnetic material such as Permalloy. A shield layer for protecting the magnetoresistive element from noises may be provided independently from the lower core layer 20 when a playback head is laminated under the lower core layer 20, or the lower core layer 20 may be used as an upper shield layer of the playback head without providing any shield layers.

Insulation layers 40 are formed at both sides of the lower core layer 20 as shown in FIG. 1. The upper surface 20a of the lower core layer 20 extending from the base of a lower magnetic pole layer 21 to be described hereinafter may be formed so as to extend in a direction parallel to the track width direction (X direction), or inclined surfaces 20b and 20b inclined to a direction departing from an upper core layer 26 may be formed as shown in FIG. 1. Forming the inclined surfaces 20b and 20b on the upper surface of the lower core layer 20 allows side-fringing to be more properly reduced.

A recording core 24 is formed on the lower core layer 20 as shown in FIGS. 1 and 2, and the recording core 24 is formed so as to be exposed on the surface facing the recording medium. The recording core 24 corresponds to a so-called track width restriction part formed with a track width Tw. The track width is preferably adjusted to be 0.7 μm or less, more preferably to be 0.5 μm or less.

The recording core 24 comprises laminated three layered film structure of the lower magnetic pole layer 21, gap layer 22 and upper magnetic pole layer 23 in the example shown in FIGS. 1 and 2. The magnetic pole layers 21 and 23, and the gap layer 22 will be described hereinafter.

As shown in FIGS. 1 and 2, the lower magnetic pole layer 21 as a lower most layer of the recording core 24 is formed by plating on the lower core layer 20. The lower magnetic pole layer 21 is magnetically coupled with the lower core layer 20, which may be formed as a monolayer or a multilayer. The lower magnetic pole layer 21 is formed with a height of, for example, about 0.3 μm.

A non-magnetic gap layer 22 is laminated on the lower magnetic pole layer 21 as shown in FIGS. 1 and 2.

The non-magnetic gap layer 22 is formed of a non-magnetic metallic material and is preferably formed on the lower magnetic pole layer 21 by plating in the present invention. According to the present invention, at least one of NiP, NiPd, NiW, NiMo, NiRh, Au, Pt, Rh, Pd, Ru and Cr are preferably selected for the non-magnetic metallic material, and the gap layer 22 may be formed either as a monolayer or a multilayer. The gap layer 22 has a height of, for example, about 0.2 µm.

The upper magnetic pole layer 23 magnetically coupled with the upper core layer 26 to be described hereinafter is formed on the gap layer 22. The upper magnetic pole layer 23 may be formed either as a monolayer or a multilayer.

The recording core 24 has a height of, for example, about 1.5 µm to 2.5 µm.

When the gap layer 22 is formed of the non-magnetic metallic material as described above, it is possible to continuously form the lower magnetic pole layer 21, gap layer 22 and upper magnetic pole layer 23 by plating.

The recording core 24 is not restricted to the laminated structure of the three layer films in the present invention, and the recording core 24 may be formed into a two layered film comprising the gap layer 22 and upper magnetic pole layer 23.

A plated underlayer 25 is formed between the lower magnetic pole layer 21 and lower core layer 20 as shown in FIG. 2. The recording core 24 is formed with a length of L2 from the surface (ABS surface) facing the recording medium toward the height direction (Y direction).

A Gd limit insulation layer (an insulation layer for restricting the gap layer depth Gd) 27 formed with a resist is formed on the lower core layer 20, and the surface of the Gd limit insulation layer 27 is formed, for example, as a curved surface. The upper magnetic pole layer 23 is formed by being extended over the curved surface.

The length L3 from the front surface of the Gd limit insulation layer 27 to the surface facing the recording medium is restricted as a gap layer depth Gd as shown in FIG. 2. The gap layer depth Gd is adjusted to have a prescribed length since it greatly influences electrical characteristics of the thin film magnetic head.

In the example shown in FIG. 2, the gap depth Gd is restricted by the position of the Gd limit insulation layer 27 formed on the lower core layer 20.

A coil layer 29 is spirally wound on the lower core layer 20 at the back in the height direction (Y direction) of the recording core 24 separated by the insulation underlayer 28. The insulation underlayer 28 is preferably formed of an insulation material of at least one of AlO, $Al_2O_3$, $SiO_2$, $Ta_2O_5$, TiO, AlN, AlSiN, TiN, SiN, $Si_3N_4$, NiO, WO, $WO_3$, BN, CrN and SiON.

The spaces among the pitches of the coil layer 29 are filled with insulation layers 30. The insulation layers 30 are preferably selected from at least one of AlO, $Al_2O_3$, $SiO_2$, $Ta_2O_5$, TiO, AlN, AlSiN, TiN, SiN, $Si_3N_4$, NiO, WO, $WO_3$, BN, CrN and SiON.

The insulation layers 30 are formed at both sides in the track width direction (X direction) of the recording core 24 so that the insulation layers 30 are exposed on the surface facing the recording medium as shown in FIG. 1.

An insulation layer 31 formed of an organic insulator such as a resist or polyimide is formed on the insulation layers 30 as shown in FIG. 2, and second coil layers 33 are formed by being spirally wound on the insulation layer 31.

The second coil layers 33 are covered with an insulation layer 32 formed of a resist or polyimide as shown in FIG. 2, and the upper core layer 26 made of a NiFe alloy and the like is formed on the insulation layer 32 by patterning by, for example, a frame plating method.

The tip surface 26a of the upper core layer 26 is formed by being magnetically coupled with the upper magnetic pole layer 23 as shown in FIG. 2, and the base 26b of the upper core layer 26 is formed on a lift-up layer 36 made of a magnetic material such as a NiFe alloy formed on the lower core layer 20 by being magnetically coupled with the lower core layer 20. The lift-up layer 36 may be omitted herein. Instead, the base 26b of the upper core layer 26 may be directly bonded on the lower core layer 20.

The tip surface 26c of the upper core layer 26 at the side facing the recording medium is formed along the facing surface as shown in FIGS. 1 and 2, and is formed so as to be exposed on the facing surface.

While two coil layers are laminated in the thin film magnetic head shown in FIG. 2, the coil layer may comprise a monolayer. The rear side in the height direction of the recording core 24 on the lower core layer 20 is filled with the insulation layer 30, and the coil layer is directly formed on the insulation layer 30. Otherwise, the second coil layer 33 shown in FIG. 2 is not formed, instead the upper core layer 26 is formed along the surface of the insulation layer 31.

The upper magnetic pole layer 23 magnetically coupled with the upper core layer 26 is made of a material having a different saturation magnetic flux density from that of the upper core layer in the present invention.

The saturation magnetic flux density Bs1 of the upper magnetic pole layer 23 is made to be higher than the saturation magnetic flux density Bs2 of the upper core layer 26 in the present invention. When the upper magnetic pole layer 23 does not comprise a monolayer but is composed of a multilayer, on the other hand, the saturation magnetic flux density of each layer is made to be larger than the saturation magnetic flux density Bs2 of the upper core layer 26. In other words, the saturation magnetic flux density Bs1 of the entire upper magnetic pole layer 23 is larger than the saturation magnetic flux density Bs2 of the upper core layer. Therefore, the upper core layer 26 having a smaller saturation magnetic flux density Bs2 than the saturation magnetic flux density Bs1 of the upper magnetic pole layer 23 is directly bonded on the upper magnetic pole layer 23.

The saturation magnetic flux density Bs1 of the upper magnetic pole layer 23 is made to be larger than the saturation magnetic flux density Bs2 of the upper core layer 26, and the upper core layer 26 is directly bonded on the upper magnetic pole layer 23 in the present invention, in order to suppress side-fringing from generating by permitting the leak magnetic field generated from the upper core layer 26 toward the upper magnetic pole layer 23 to concentrate in the vicinity of the gap layer, thereby spreading of the leak magnetic field is restricted within as small an area as possible out of the track width Tw.

Suppressing side-fringing from generating allows the recording density to be improved to meet the requirement of high density recording in the future.

Magnetic saturation, hence attenuation of the magnetic flux density, in the upper magnetic pole layer 23 is suppressed in the present invention by making the saturation magnetic flux density Bs1 of the upper magnetic pole layer to be higher than the saturation magnetic flux density Bs2 of the upper core layer 26. Consequently, the overwrite may be improved.

Preferably, the ratio Bs1/Bs2 between the saturation magnetic flux density Bs1 of the upper magnetic pole layer 23 and the saturation magnetic flux density Bs2 of the upper core layer 26 is 1.08 or more in the present invention, because side-fringing is suppressed while improving the overwrite when the ratio is within the range as described above.

The saturation magnetic flux density Bs1 of the upper magnetic pole layer 23 is preferably 1.3 T (tesla) or more in the present invention. The upper magnetic pole layer 23 is preferably made of a FeNi based alloy or CoNiFe based alloy. When the upper magnetic pole layer 23 is made of the FeNi based alloy, for example, the saturation magnetic flux density Bs1 of the upper magnetic pole layer 23 may be adjusted to be 1.3 T or more when the Fe content is 50 at % or more.

Adjusting the saturation magnetic flux density Bs1 of the upper magnetic pole layer 23 to be 1.3 T or more permits the leak magnetic field from the upper core layer 26 to concentrate in the vicinity of the gap layer to properly suppress side fringing from generating while improving the overwrite.

The saturation magnetic flux density Bs2 of the upper core layer 26 is preferably 1.2 T or less in the present invention. The upper core layer 26 is preferably made of the NiFe based alloy. When the saturation magnetic flux density Bs2 of the upper core layer 26 is 1.2 T or less, the leak magnetic field generated from the upper core layer 26 concentrates in the vicinity of the gap layer to enable generation of side-fringing to be properly suppressed while improving the overwrite.

The saturation magnetic flux densities of the lower core layer 20 and lower magnetic pole layer 21 will be described hereinafter.

It is preferable that the saturation magnetic flux density of the lower core layer 20 is lower than the saturation magnetic flux density of the lower magnetic pole layer 21, because the leak magnetic field concentrates in the vicinity of the gap layer and generation of side-fringing is properly suppressed.

The lower core layer 20 preferably has a saturation magnetic flux density of 0.8 T or more. It is preferable that the lower core layer 20 is made of, for example, a NiFe based alloy, CoNbZr based alloy and CoZrTa based alloy. The saturation magnetic flux density of the lower core layer 20 is adjusted to be 0.8 T or more because, when the saturation magnetic flux density of the lower core layer 20 is less than 0.8 T, the lower magnetic pole layer 21 is not so sufficiently saturated that the overwrite decreases.

The saturation magnetic flux density of the lower magnetic pole layer 21 is preferably adjusted to be 1.3 t or more in the present invention, as the saturation magnetic flux density Bs1 of the upper magnetic pole layer 23 is. The lower magnetic pole layer 21 is made of the same magnetic material as used in the upper magnetic pole layer 23. When the lower magnetic pole layer 21 comprises a multilayer, each layer in the multilayer preferably has a saturation magnetic flux density of 1.3 T or more. However, the lower magnetic pole layer 21 preferably has the same magnitude or less of the saturation magnetic flux density as the saturation magnetic flux density Bs1 of the upper magnetic pole layer 23, in order to favor inversion of magnetization and improve the recording intensity.

Making the saturation magnetic flux density of the lower magnetic pole layer 21 to be higher than that of the lower core layer 20 permits the leak magnetic field to concentrate in the vicinity of the gap layer, thereby allowing generation of side-fringing to be properly suppressed.

Figure 3:
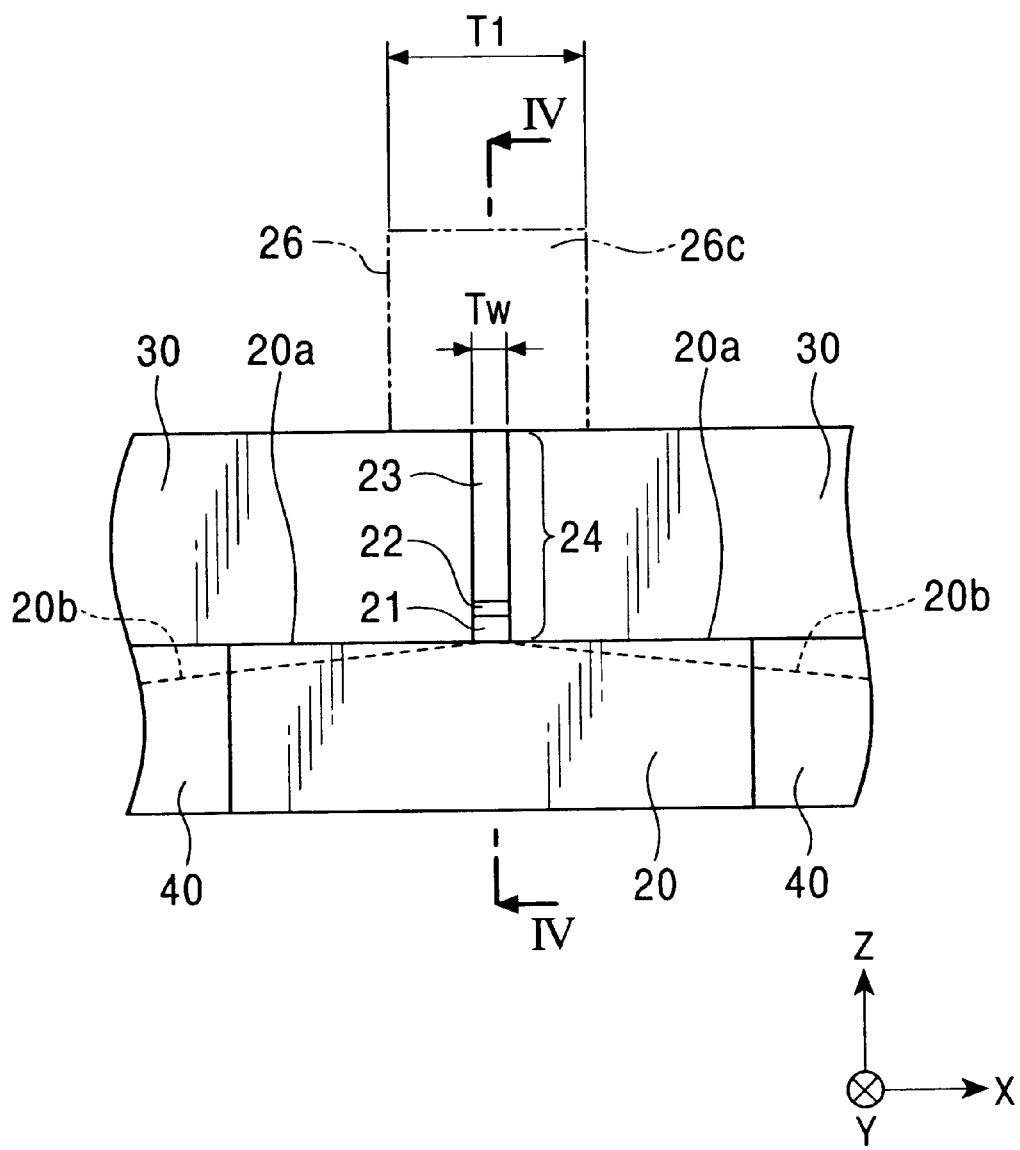
FIG. 3 shows a partial front view of the structure of the thin film magnetic head in another embodiment according to the present invention.
Figure 4:
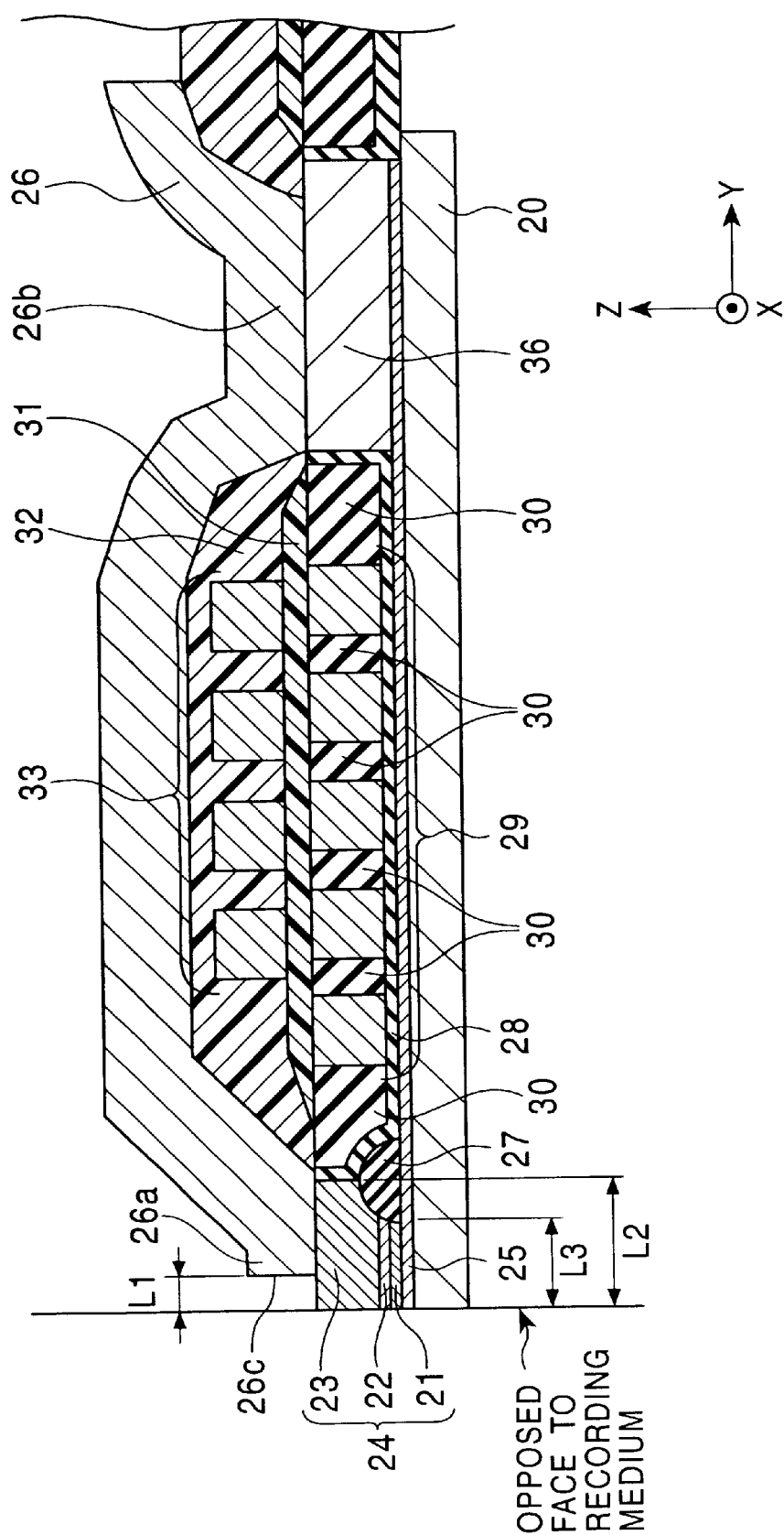
FIG. 4 shows a partial cross section of the thin film magnetic head cut along the line IV—IV in FIG. 3.

FIG. 3 shows a partial front view of the thin film magnetic head viewed from the surface side facing the recording medium in the second embodiment according to the present invention. FIG. 4 shows a partial cross section of the thin film magnetic head cut along the line IV—IV in FIG. 3.

The thin film magnetic head according to this embodiment is different from the thin film magnetic element shown in FIGS. 1 and 2 in the position of the tip surface 26c on the surface facing the recording medium of the upper core layer 26.

As has been already described in FIGS. 1 and 2, the tip surface 26c of the upper core layer 26 is formed along the surface facing the recording medium, and is exposed from the facing surface.

The saturation magnetic flux density Bs1 of the upper magnetic pole layer 23 is made to be higher than the saturation magnetic flux density Bs2 of the upper core layer 26, and the upper core layer 26 is directly bonded on the upper magnetic pole layer 23 in the present invention, even when the tip surface 26c is formed so as to be exposed on the surface facing the recording medium. Consequently, side-fringing is properly suppressed from generating as compared with the conventional thin film magnetic head to allow the overwrite to be improved.

The saturation magnetic flux density Bs1 of the upper magnetic pole layer 23 is adjusted to be higher than the saturation magnetic flux density Bs2 of the upper core layer 26, and the upper magnetic pole layer 23 is directly bonded on the upper core layer 26. However, it has been confirmed that side-fringing is not substantially generated even by forming the tip surface 26c of the upper core layer 26 so as to be exposed from the surface facing the recording medium as shown in the experimental results to be described hereinafter.

When the tip surface 26c of the upper core layer 26 is formed so as to be retreated from the facing surface toward the height direction (Y direction) as shown in FIGS. 3 and 4, on the other hand, side-fringing may be more properly suppressed from generating.

When the retreat length (recess length) is too large, however, the recording magnetic field flowing from the upper core layer 26 to the upper magnetic pole layer 23 attenuates due to decrease of the contact area between the upper core layer 26 and upper magnetic pole layer 23, causing deterioration of the overwrite. On the contrary, side-fringing may be more properly prevented from generating in the present invention even by forming the tip surface to be slightly retreated, because side-fringing is not substantially generated by forming the tip surface 26c so as to be exposed from the facing surface. In addition, the overwrite may be also prevented from being deteriorated since decrease of the contact area between the upper core layer 26 and upper magnetic pole layer 23 is not so decreased.

The tip surface 26c of the upper core layer 26 can be formed so as to be retreated from the opposed surface toward the height direction in the present invention. Consequently, side-fringing may be more properly prevented from generating while maintaining high overwrite since the retreat length may be smaller in the present invention as compared with the conventional thin film magnetic head.

The shortest retreat length L1 from the surface facing the recording medium to the tip surface 26c of the upper core layer 26 is preferably in the range of $0<L1 \leq 1.5$ μm. Experiments to be described hereinafter have shown that the overwrite of 25 dB or more can be certainly obtained at the retreat length L1 of 1.5 μm or less. A retreat length L1 of less than 1.0 μm is preferable for further improving the overwrite.

Side-fringing can be properly prevented from generating by such small retreat length as described above in the present invention, and this small retreat length enables high overwrite to be maintained.

According to the thin film magnetic head in the present invention as hitherto described, the saturation magnetic flux density Bs1 of the upper magnetic pole layer 23 is adjusted to be higher than the saturation magnetic flux density Bs2 of the upper core layer 26, and the upper magnetic pole layer 23 is directly bonded on the upper core layer 26. As a result, the leak magnetic field generated between the upper core layer 26 and upper magnetic pole layer 23 properly concentrates in the vicinity of the gap layer, thereby suppressing side-fringing from generating while improving the overwrite.

The tip surface 26c at the side of the surface facing the recording medium of the upper core layer 26 may be retreated from the opposed surface toward the height direction (Y direction). Consequently, side-fringing can be properly suppressed from generating by allowing the tip surface to slightly retreat in the present invention, thereby maintaining high overwrite with a slight retreat length of the tip surface.

EXAMPLES

Recording signals were recording on the recording medium using the thin film magnetic head shown in FIGS. 1 and 2, or the thin film magnetic head having the tip surface 26c of the upper core layer 26 formed so as to be exposed on the surface facing the recording medium. The relation between the positions from the center of the track width Tw through the track width direction (X direction) and the playback out put (TAA) at each position was measured by regenerating the recording signal with a MR head (playback head).

In the experiment using the thin film magnetic head shown in FIG. 1, a NiFe based alloy (saturation magnetic flux density=1.0 T) was used for the lower core layer 20, a FeNi based alloy (saturation magnetic flux density=1.5 T) was used for the lower magnetic pole layer 21, the FeNi based alloy (saturation magnetic flux density=1.5 T) was used for the upper magnetic pole layer 23, and the NiFe based alloy (saturation magnetic flux density=1.0 T) was used for the upper core layer 26.

Figure 5:
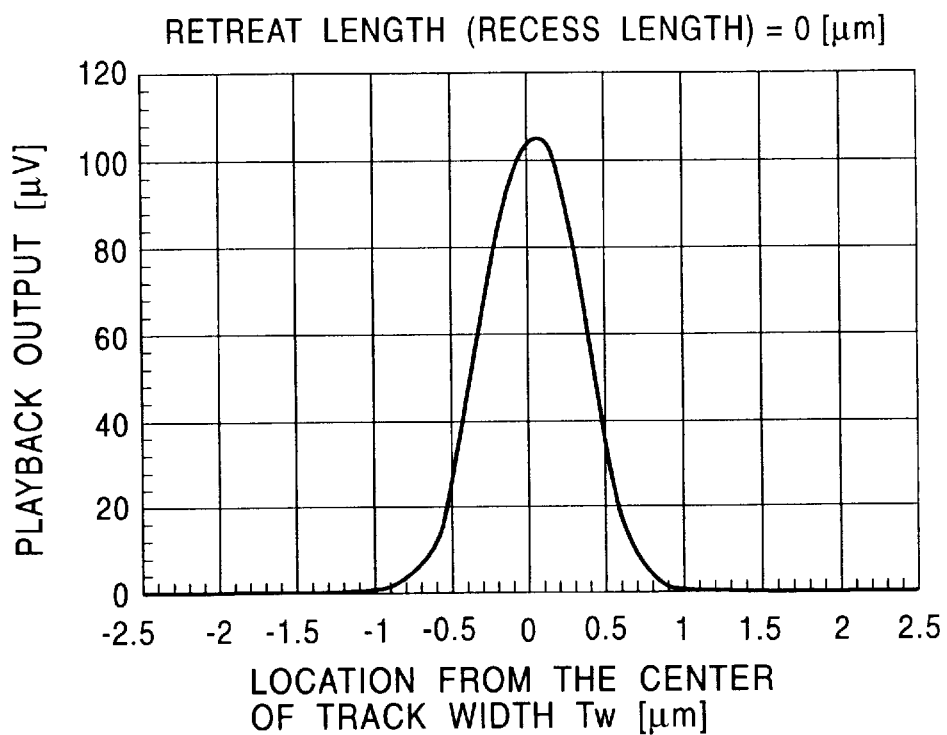
FIG. 5 is a graph showing the relation between the position of the MR head from the center of the track width Tw and the playback output at the position when a signal is recorded using the thin film magnetic head shown in FIGS. 1 and 2, and regenerated with the MR head.
Figure 6:
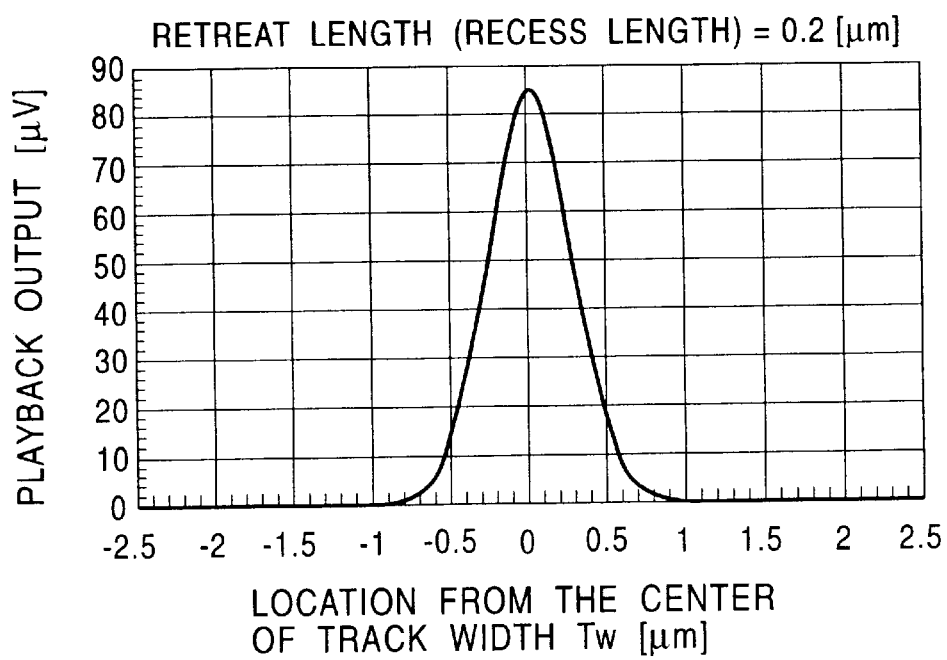
FIG. 6 is a graph showing the relation between the position of the MR head from the center of the track width Tw and the playback output at the position when a signal is recorded using the thin film magnetic head (retreat distance L1 of 0.2 μm) shown in FIGS. 3 and 4, and regenerated with the MR head.
Figure 7:
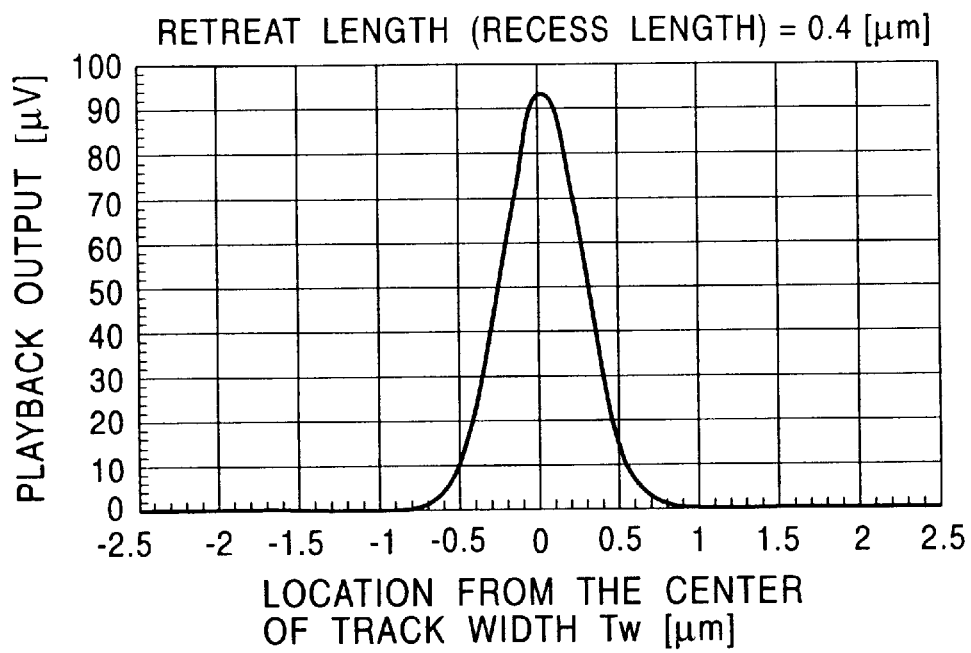
FIG. 7 is a graph showing the relation between the position of the MR head from the center of the track width Tw and the playback output at the position when a signal is recorded using the thin film magnetic head (retreat distance L1 of 0.4 μm) shown in FIGS. 3 and 4, and regenerated with the MR head.
Figure 8:
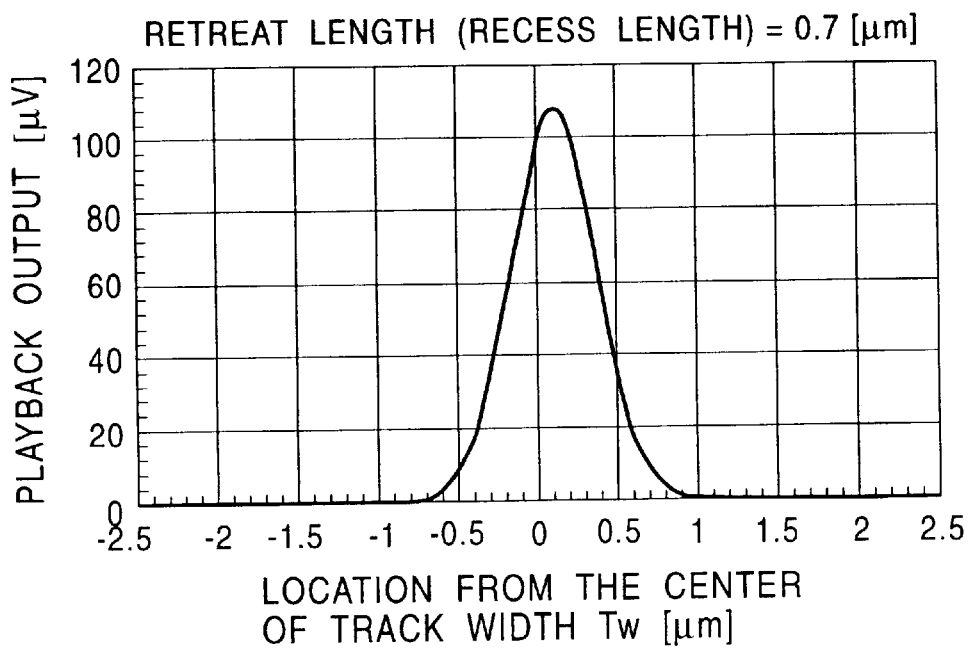
FIG. 8 is a graph showing the relation between the position of the MR head from the center of the track width Tw and the playback output at the position when a signal is recorded using the thin film magnetic head (retreat distance L1 of 0.7 μm) shown in FIGS. 3 and 4, and regenerated with the MR head.
Figure 9:
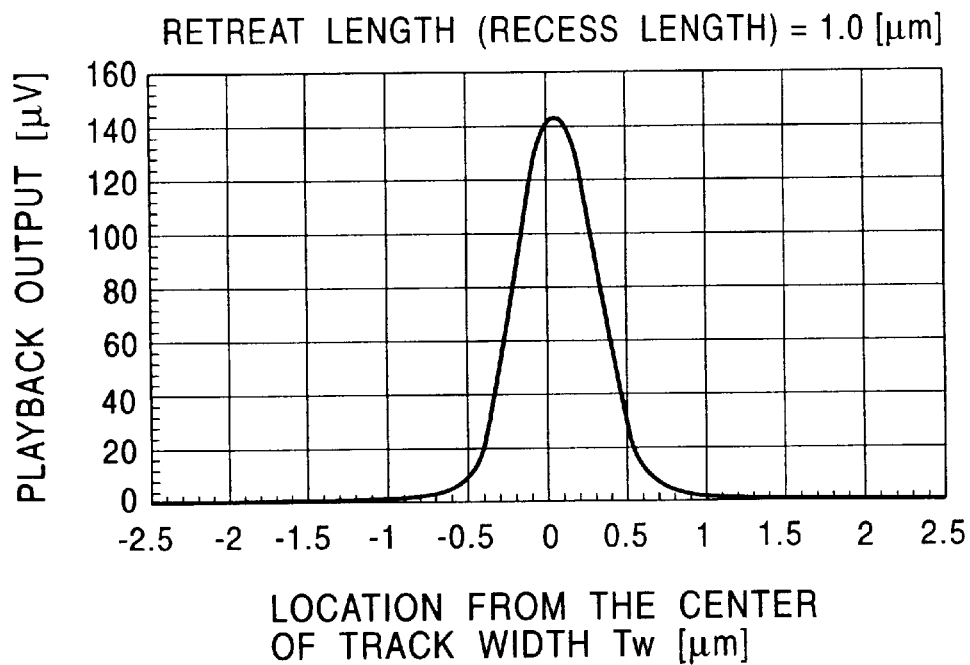
FIG. 9 is a graph showing the relation between the position of the MR head from the center of the track width Tw and the playback output at the position when a signal is recorded using the thin film magnetic head (retreat distance L1 of 1.0 μm) shown in FIGS. 3 and 4, and regenerated with the MR head.

FIG. 5 shows the experimental results. The point denoted by zero on the horizontal axis indicates the center of the track width in the playback head.

As shown in FIG. 5, only one peak of the playback output was observed approximately at the center of the track width Tw, and no side-fringing was generated at all.

FIGS. 6 to 9 are the graphs showing the relation between the positions from the center of the track width Tw through the track width direction (X direction) and the playback output (TAA) at each position when recording signals are regenerated using a MR head (a playback head), wherein the recording signals are recorded using the thin film magnetic head shown in FIGS. 3 and 4, or a thin film magnetic head in which the tip surface 26c of the upper core layer 26 is retreated from the surface facing the recording medium toward the height direction (Y direction).

FIGS. 6, 7, 8 and 9 show the experimental results when the tip surface 26c is retreated toward the height direction by a distance of 0.2 μm, 0.4 μm, 0.7 μm and 1.0 μm, respectively. The same materials as used in each layer shown in FIG. 5 were also used for the lower core layer 20, lower magnetic pole layer, upper magnetic pole layer and upper core layer.

FIGS. 6 to 9 show that no side-fringing is generated irrespective of the retreat length.

A thin film magnetic head as another embodiment of the present invention was manufactured, and the relation between the positions of the thin film magnetic head from the center of the track width through the track width direction (X direction) and the playback output (TAA) at each position was measured.

Figure 14:
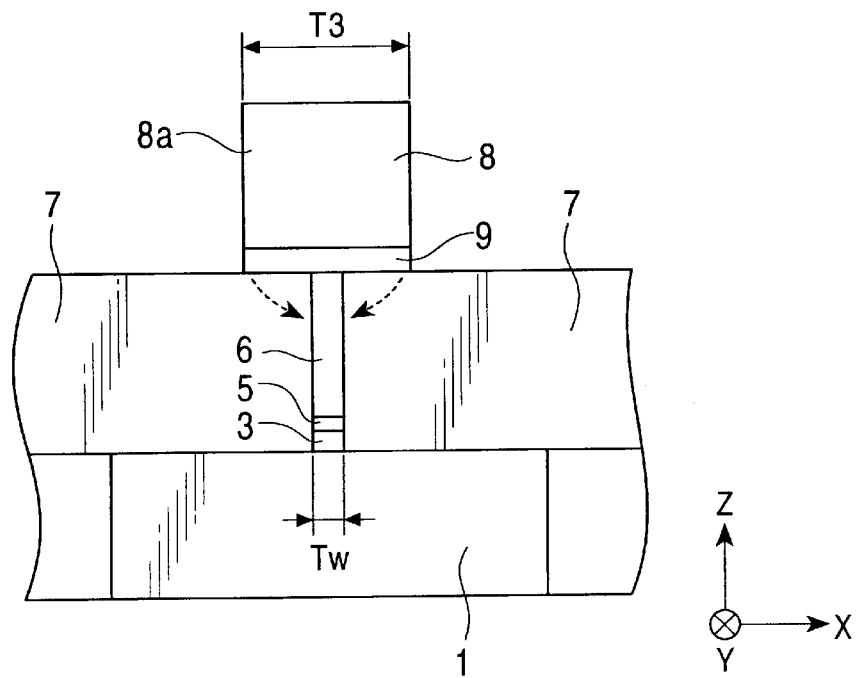
FIG. 14 shows a partial front view of the structure of another conventional thin film magnetic head.

The upper magnetic pole layer 6 is not directly bonded on the upper core layer 8 in the thin film magnetic head shown in FIG. 14, instead the upper magnetic pole layer 6 is separated from the upper core layer 8 by a magnetic intermediate layer 9.

The magnetic intermediate layer 9 is formed with a width T3 wider than the track width Tw on the upper magnetic pole layer 6 and insulation layer 7 as shown in FIG. 14, and an upper core layer 8 having the same width as the magnetic intermediate layer 9 is formed on the magnetic intermediate layer 9.

The magnetic intermediate layer 9 is formed of the same FeNi based alloy as used in the upper magnetic pole layer 6, and upper core layer 8 is made of a NiFe based alloy. This means that the magnetic intermediate layer 9 has the same saturation magnetic flux density as that of the upper magnetic pole layer 6, and the saturation magnetic flux density of the magnetic intermediate layer 9 and upper magnetic pole layer 6 is higher than the saturation magnetic flux density of the upper core layer 8 in the structure shown in FIG. 14.

The tip surface 8a of the upper core layer 8 and the magnetic intermediate layer 9 are formed so as to be exposed on the surface facing the recording medium.

Figure 10:
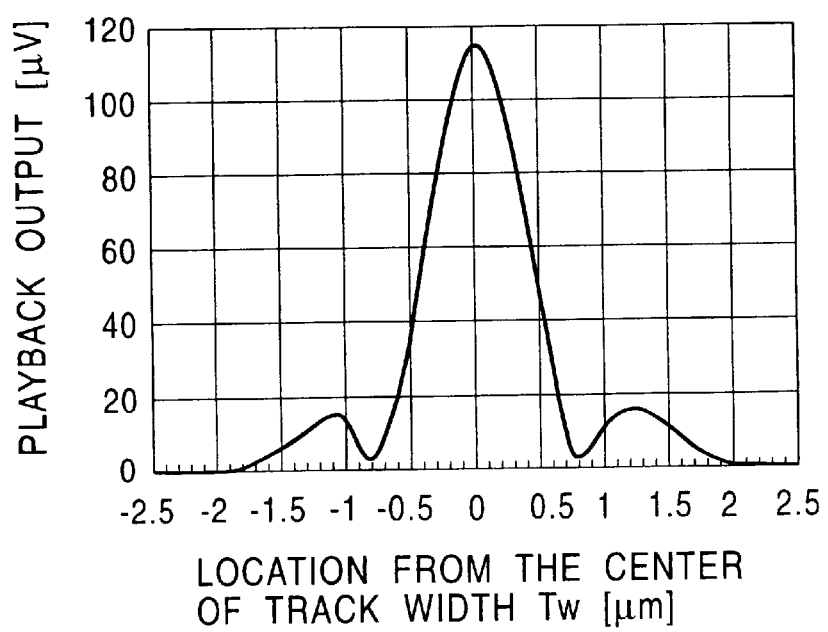
FIG. 10 is a graph showing the relation between the position of the MR head from the center of the track width Tw and the playback output at the position when a signal is recorded using the thin film magnetic head shown in FIG. 14, and regenerated with the MR head.

The relation between the positions from the center of the track width Tw trough the track width direction (X direction) and the playback output (TAA) at each position is shown in FIG. 10, when recording signals are recorded on the recording medium using the thin film magnetic head shown in FIG. 14 and regenerated using a MR head.

As shown in FIG. 10, two small playback peaks were observed at the positions separated by a distance of 1.0 μm to 1.5 μm from the center of the track width Tw toward the track width direction, although a large playback peak was observed approximately at the center of the track width Tw.

Since the playback outputs at these two small peaks are ascribed to side-fringing, it may be understood that side-fringing has not been properly suppressed from generating in the structure of the thin film magnetic head shown in FIG. 14.

The leak magnetic field is generated between the upper magnetic pole layer 6 and magnetic intermediate layer 9 dispose with a short distance between them. The magnetic intermediate layer 9 directly bonded on the upper magnetic pole layer 6 is formed to have a width wider than the width of the upper magnetic pole layer 6, besides forming the magnetic intermediate layer 9 and upper magnetic pole layer 6 to have the same saturation magnetic flux density with each other. Consequently, the leak magnetic field does not concentrate in the vicinity of the gap layer and is generated by being spread with a width wider than the track width Tw, thereby generating side-fringing.

Figure 15:
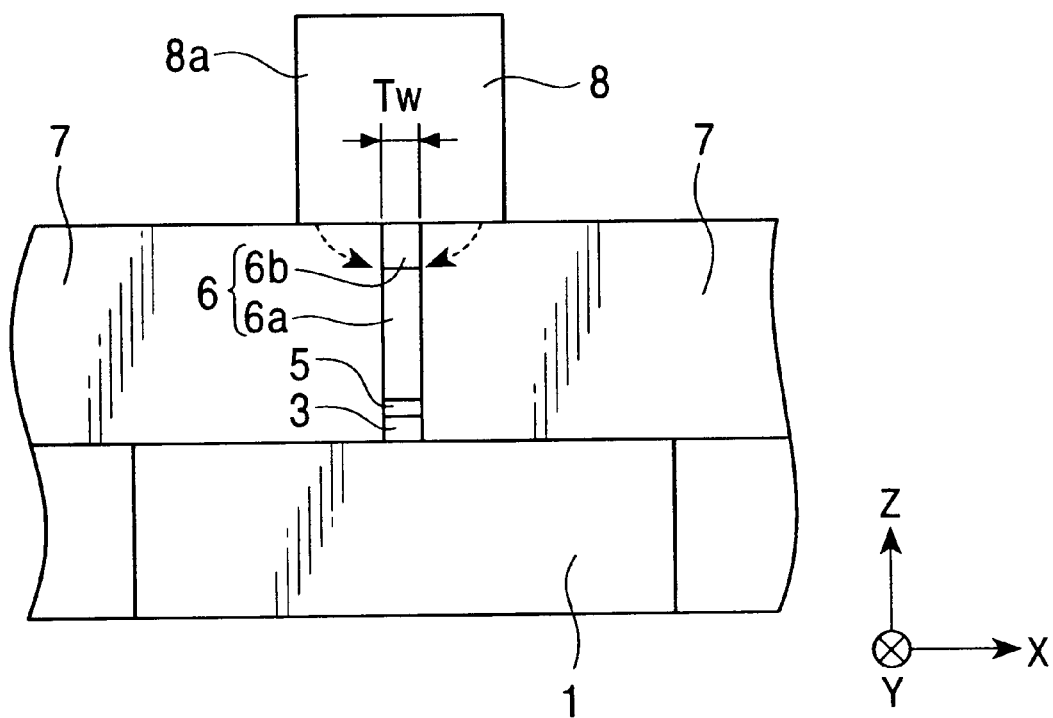
FIG. 15 shows a partial front view of the structure of a different conventional thin film magnetic head.

Recording signals were recorded on the recording medium using the thin film magnetic head shown in FIG. 15, and was regenerated using the MR head. The relation between the positions from the center of the track width Tw through the track width direction (X direction) and the playback output (TAA) at each position was measured.

In the thin film magnetic head shown in FIG. 15, the upper magnetic pole layer 6 comprises a laminated structure of the layers indicated by the reference numerals 6a and 6b, and the upper core layer 8 is bonded on the layer 6b.

The layer 6b and the upper core layer 8 are formed of the NiFe based alloy to have the same saturation magnetic flux density Bs with each other, and the layer 6a is formed of a material having a higher saturation magnetic flux density Bs than that of the layer 6b. In other words, the magnetic flux density is the same with respect to the layer 6b and the upper core layer 8, and the saturation magnetic flux density of the layer 6b and upper core layer 8 is lower than the saturation magnetic flux density of the layer 6a.

The tip surface 8a of the upper core layer 8 is formed so as to be exposed on the surface facing the recording medium in the thin film magnetic head shown in FIG. 15.

Recording signals were recorder on a recording medium using the thin film magnetic head shown in FIG. 15, and were regenerated using the HR head. The relation between the positions from the center of the track width Tw through the track width direction (X direction) and the playback output (TAA) at each position is shown in FIG. 11.

Figure 11:
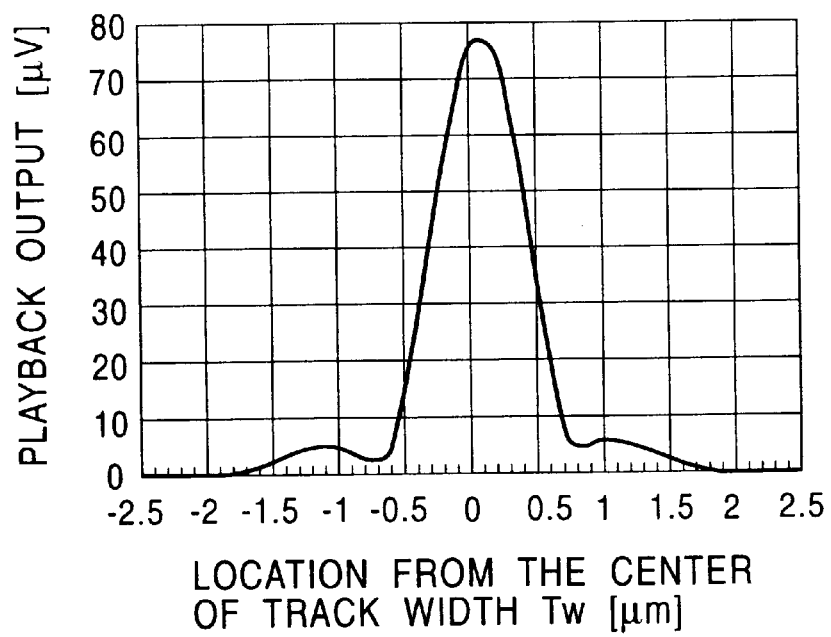
FIG. 11 is a graph showing the relation between the position of the MR head from the center of the track width Tw and the playback output at the position when a signal is recorded using the thin film magnetic head shown in FIG. 15, and regenerated with the MR head.

As shown in FIG. 11, a large playback peak is observed approximately at the center of the track width Tw. Although the playback output rapidly decreases in accordance with the distance from the center of the track width Tw, it does not decrease to 0 $\mu$V. Instead, a small magnitude of the output remains to be observed at the position by about 0.7 $\mu$V apart from the center of the track width Tw, and the output finally comes to 0 $\mu$V at the position by about 1.7 $\mu$V apart from the center of the track width Tw.

The playback output is observed over a wide range along the track width direction when the thin film magnetic head shown in FIG. 15 is used. This expanded output serves as side-fringing.

The layer constituting the upper magnetic pole layer 6 comprises two layers 6a and 6b, and the layer 6b having a smaller saturation magnetic flux density is formed at the side in contact with the upper core layer 8. Consequently, the leak magnetic field is liable to be generated between the upper core layer 8 and the layer 6b disposed with a short distance with each other. Since the upper core layer 8 and the layer 6b are formed of the same magnetic material to have the same saturation magnetic flux density with each other, the leak magnetic field generated from the upper core layer 8 does not concentrate in the vicinity of the gap layer. Instead, the leak magnetic field is generated by being expanded with a width wider than the track width Tw to readily generate side-fringing.

As hitherto described, it was revealed that the structures of the thin film magnetic heads shown in FIGS. 14 and 15 are not preferable because side-fringing is observed in both types of the thin film magnetic heads.

Generation of side-fringing may be suppressed to a certain extent in the thin film magnetic heads shown in FIGS. 14 and 15 by allowing the tip surface 8a to retreat toward the height direction (Y direction) from the facing surface since the tip surface 8a of the upper core layer 8 is exposed on the surface facing the recording medium. Although side-fringing cannot be properly suppressed unless the retreat length is large, the large retreat length in turn considerably deteriorates the overwrite. Accordingly, suppression of side-fringing and improvement of the overwrite cannot be simultaneously satisfied in the structures of the thin film magnetic heads shown in FIGS. 14 and 15.

The saturation magnetic flux density of the upper magnetic pole layer 23 is made to be larger than the saturation magnetic flux density of the upper core layer 26, and the upper core layer 26 is directly bonded on the upper magnetic pole layer 23 as described in the present invention. This structure is recognized to be preferable since no side-fringing is generated as shown in the experimental results in FIGS. 5 to 9.

The overwrite were measured by regenerating the recording signals using the MR head after recording the recording signals on the recording medium using the thin film magnetic head according to the present invention. The tip surface 26c of the upper core layer 26 was exposed on the surface facing the recording medium, and the overwrite of the thin film magnetic head was measured as in FIGS. 5 to 9. The retreat lengths of the tip surface from the opposed surface were 0 $\mu$m, 0.2 $\mu$m, 0.4 $\mu$m, 0.7 $\mu$m and 1.0 $\mu$m. The same materials as used in the experiment shown in FIG. 5 were also used for the lower core layer 20, lower magnetic pole layer 21, upper magnetic pole layer 23 and upper core layer 26. The experimental results are shown in FIG. 12.

Figure 12:
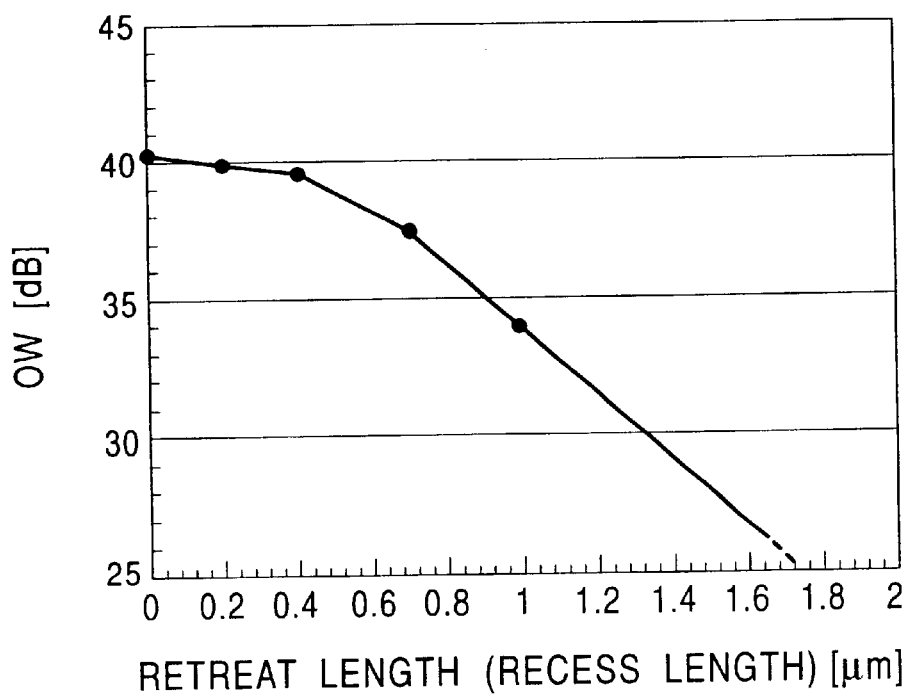
FIG. 12 is a graph showing the relation between the retreat distance of the tip surface of the upper core layer and the overwrite when a signal is recorded using the thin film magnetic head according to the present invention, and regenerated with the MR head.
Figure 13:
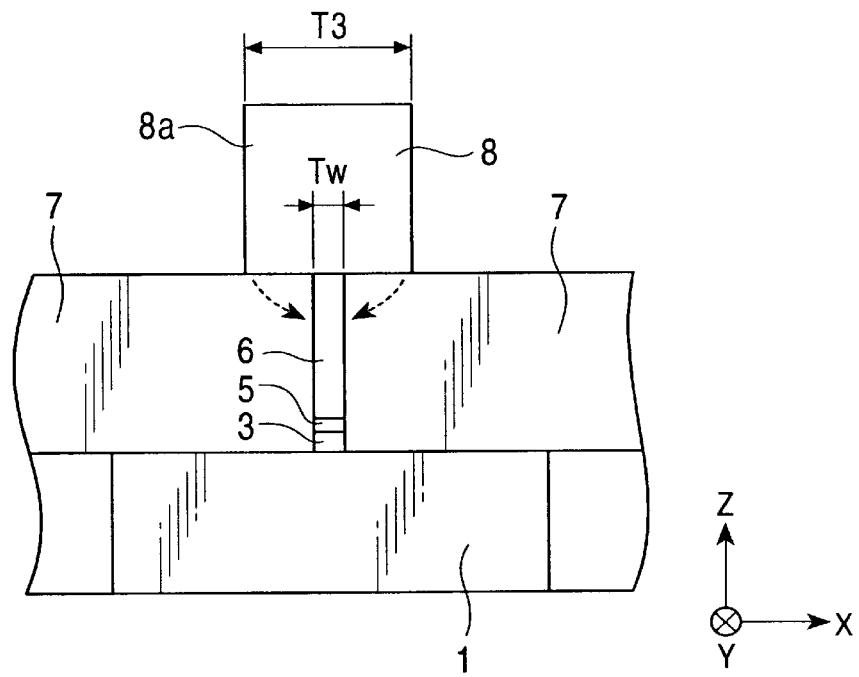
FIG. 13 shows a partial front view of the structure of a conventional thin film magnetic head.

FIG. 12 shows that the overwrite decreases as the retreat length increases. Decrease of the overwrite may be ascribed to the reduced contact area between the upper core layer 26 and upper magnetic pole layer 23 when the tip surface 26c of the upper core layer 26 is retreated from the opposed surface toward the height direction.

Judging from these experimental results, the suitable retreat length was determined to be 1.5 $\mu$m in the present invention. This length permits side-fringing to be properly suppressed from generating while preventing decrease of the overwrite to be as small as possible to enable a high overwrite to be maintained. Actually, an overwrite of as high as 25 dB or more may be certainly obtained.

According to the present invention as hitherto described, the leak magnetic field generated from the upper core layer toward the upper magnetic pole layer can concentrate in the vicinity of the gap layer by making the saturation magnetic flux density of the upper magnetic pole layer to be higher than the saturation magnetic flux density of the upper core layer, and by directly bonding the upper core layer on the upper magnetic pole layer, thereby permitting generation of side-fringing to be suppressed low as compared with the conventional thin film magnetic head. Attenuation of the magnetic flux density can be suppressed in the present invention by increasing the saturation magnetic flux density of the upper magnetic pole layer to suppress magnetic saturation of the upper magnetic pole layer, thereby enabling the overwrite to be increased.

The tip surface at the surface side of the upper core layer facing the recording medium may be retreated toward the height direction, in order to properly suppress side-fringing from generating. A small retreat length of the tip surface is sufficient for properly suppressing side-fringing in the present invention, since side-fringing may be more properly suppressed as compared with the conventional thin film magnetic head even by exposing the tip surface on the surface facing the recording medium. Accordingly, the retreat length may be freely determined in the present invention for allowing the tip surface to retreat from the opposed surface toward the height direction. In addition, the shirt retreat length permits side-fringing to be properly suppressed while maintaining a high overwrite.

What is claimed is:

1. A thin film magnetic head comprising:
   a lower core layer;
   a recording core comprising a lower magnetic pole layer, a gap layer and an upper magnetic pole layer, or a gap layer and an upper magnetic pole layer, sequentially laminated on the lower core layer, and exposed on a surface facing a recording medium;

an upper core layer formed on the recording core; and a coil for inducing a recording magnetic field on the lower core layer, recording core and upper core layer, wherein the upper magnetic pole layer is formed of a magnetic material having a higher saturation magnetic flux density than the upper core layer, and the upper core layer is directly bonded to the upper magnetic pole layer, wherein a tip surface of the upper core layer directing toward a surface side facing the recording medium is located at a certain distance retreat from a surface facing the recording medium to the height direction, wherein a shortest retreat distance L1 from the surface facing the recording medium to the tip surface of the upper core layer is within a range of 0<L1<1.5 μm, and wherein the lower core layer has upper surfaces each extending from a base of the lower magnetic pole layer and inclining in a direction away from the upper core layer.

2. The thin film magnetic head according to claim 1, wherein the ratio Bs1/Bs2 between a saturation magnetic flux density Bs1 of the upper magnetic pole layer and a saturation magnetic flux density Bs2 of the upper core layer is 1.08 or more.

3. The thin film magnetic head according to claim 1, wherein a saturation magnetic flux density Bs1 of the upper magnetic pole layer is 1.3 T or more.

4. The thin film magnetic head according to claim 1, wherein a saturation magnetic flux density Bs2 of the upper core layer is 1.2 T or less.

\* \* \* \* \*

UNITED STATES PATENT AND TRADEMARK OFFICE
CERTIFICATE OF CORRECTION

PATENT NO.   : 6,731,458 B2  
DATED        : May 4, 2004  
INVENTOR(S)  : Watanabe et al.

Page 1 of 1

It is certified that error appears in the above-identified patent and that said Letters Patent is hereby corrected as shown below:

<u>Title page,</u>
Item [*] Notice, delete the phrase "by 167" and insert -- by 85 days --

Signed and Sealed this

Tenth Day of May, 2005

JON W. DUDAS
*Director of the United States Patent and Trademark Office*